(12) United States Patent
Kang et al.

(10) Patent No.: US 8,536,275 B2
(45) Date of Patent: *Sep. 17, 2013

(54) ACRYL-BASED COPOLYMERS AND OPTICAL FILM INCLUDING THE SAME

(75) Inventors: Byung-Il Kang, Daejeon (KR);
Chang-Hun Han, Daejeon (KR);
Dae-Woo Lee, Busan (KR); Eun-Jung Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,745

(22) Filed: Jun. 13, 2011

(65) Prior Publication Data

US 2012/0004372 A1    Jan. 5, 2012

(30) Foreign Application Priority Data

Jun. 30, 2010  (KR) .................. 10-2010-0062418

(51) Int. Cl.
| | | |
|---|---|---|
| *C08L 69/00* | (2006.01) | |
| *C08F 226/06* | (2006.01) | |
| *C09K 19/00* | (2006.01) | |
| *B29D 7/01* | (2006.01) | |

(52) U.S. Cl.
USPC ........... 525/148; 525/468; 526/262; 349/118; 428/1.1

(58) Field of Classification Search
USPC ................ 526/262; 525/148, 468; 349/118; 428/1.1

See application file for complete search history.

(56) References Cited

U.S. PATENT DOCUMENTS

| | | | |
|---|---|---|---|
| 7,348,382 B2 * | 3/2008 | Ueno et al. .................. | 526/87 |
| 2009/0292074 A1 | 11/2009 | Kim et al. | |
| 2010/0128206 A1 | 5/2010 | Kim et al. | |
| 2011/0297896 A1 * | 12/2011 | Kim et al. .................. | 252/585 |

FOREIGN PATENT DOCUMENTS

| | | |
|---|---|---|
| EP | 1930748 | 6/2008 |
| JP | 2008-146003 | 6/2008 |
| JP | 2008-299096 | 12/2008 |
| KR | 10-0952285 B1 | 4/2010 |
| KR | 10-2010-0066066 A | 6/2010 |
| WO | WO 2007/026659 | 3/2007 |
| WO | WO 2010/095870 A2 * | 8/2010 |

OTHER PUBLICATIONS

Hawley's Condensed Chemical Dictionary, 14th Ed., 2002 (J. Wiley & Sons, Inc.), entry for "aliphatic".*

* cited by examiner

*Primary Examiner* — Fred M Teskin

(74) *Attorney, Agent, or Firm* — McKenna, Long & Aldridge, LLP

(57) ABSTRACT

The present invention relates to acryl-based copolymers including an alkyl(meth)acrylate-based monomer; a (meth)acrylate-based monomer containing an aromatic ring; and a maleimide-based monomer, a resin composition including the same, and an optical film prepared by using the same.

16 Claims, No Drawings

ACRYL-BASED COPOLYMERS AND OPTICAL FILM INCLUDING THE SAME

CROSS-REFERENCE TO RELATED APPLICATIONS

This application claims the priorities of Korean Patent Application Nos. 10-2010-0062418 filed on Jun. 30, 2010 and 10-2011-0044382 filed on May 12, 2011, in the Korean Intellectual Property Office, the disclosure of which is incorporated herein by reference.

BACKGROUND OF THE INVENTION

1. Field of the Invention

The present invention relates to acryl-based copolymers and an optical film including the same.

2. Description of the Related Art

Recently, the display technology using various methods such as plasma display panel (PDP), liquid crystal display (LCD), etc., which replace related-art Braun tubes based on the development of optical technologies, has been proposed and put on the market. The higher properties of the polymer material for displays are required. For example, in the case of LCD, realization of wide viewing angle, implementation of high contrast, suppression of change in image color tone according to the viewing angle and uniformity of the screen display have been particularly considered as important problems, while the development toward thin film, lightness, and enlargement of the screen area has been sought.

Accordingly, various polymer films such as polarizing film, polarizer protection film, retardation film, plastic substrate, light guide plate, etc. are used, and as the liquid crystal, various modes of liquid crystal displays such as twisted nematic (TN), super twisted nematic (STN), vertical alignment (VA), in-plane switching (IPS) liquid crystal cells, etc. have been developed. Since all of these liquid crystal cells have intrinsic liquid crystal alignment, they have intrinsic optical anisotropic property, and in order to compensate the optical anisotropic property, a film in which a retardation function is provided by stretching various kinds of polymers has been suggested.

Specifically, since liquid crystal display devices use high birefringence property and alignment of liquid crystal molecules, the refractive indices are different according to the viewing angle and thus the color and brightness of the picture are changed. For example, since most of the liquid crystal molecules that are used in a vertical alignment manner have the thickness refractive index that is larger than the average in-plane refractive index in a liquid crystal display surface, a compensation film in which the thickness refractive index is smaller than the average in-plane refractive index is required in order to compensate this. In addition, light does not pass through the front sides of two polarizing plates that are vertical to each other. However, when the angle is inclined, the light axes of two polarizing plates are not vertical to each other, and thus light leakage occurs. In order to compensate this, a compensation film having the in-plane retardation is required. In addition, display devices using the liquid crystal require both thickness retardation compensation and in-plane retardation compensation in order to widen the angle view.

The retardation compensation films are required to easily control the birefringence. However, the film birefringence is formed not only by a basic birefringence which belongs to the material, but also by the orientation of polymer chains in the film. Most of the orientation of the polymer chains is forcibly performed by force applied from the outside or is caused by the intrinsic properties of the material, and the orientation method of the molecules by the external force is to stretch the polymer film uniaxially or biaxially.

In order to solve the viewing angle problems of LCD due to the intrinsic birefringence properties of liquid crystal, N-TAC, V-TAC, and COP Films have been recently used as compensation or retardation films. However, these films have problems that their prices are high and processes are complicated during manufacturing.

SUMMARY OF THE INVENTION

An aspect of the present invention provides acryl-based copolymers which maintain transparency and are excellent in heat resistance compared to those in the related art. Another aspect of the present invention provides a resin containing one or two selected from aromatic and aliphatic rings in a main chain included in a compounding resin for optical film and an acryl-based copolymer resin which is excellent in compatibility.

Another aspect of the present invention provides a resin composition including a resin containing one or two selected from aromatic and aliphatic rings in the acryl-based resin and the main chain.

Another aspect of the present invention provides an optical film which includes the resin composition and is excellent in heat resistance and optical transparency, and a liquid crystal display device including the optical film.

According to an aspect of the present invention, there is provided an acryl-based copolymer, including:
an alkyl(meth)acrylate-based monomer;
a (meth)acrylate-based monomer containing an aliphatic ring; and
a maleimide-based monomer.

According to another aspect of the present invention, there is provided a compounding resin in which the acryl-based copolymer of the present invention is mixed with a resin containing one or two selected from aromatic and aliphatic rings in a main chain.

According to another aspect of the present invention, there is provided an optical film including the compounding resin of the present invention.

According to another aspect of the present invention, there is provided a liquid display device including the optical film of the present invention.

An acryl-based copolymer according to the present invention is excellent in heat resistance while maintaining transparency. In addition, the acryl-based copolymer is excellent in compatibility with a resin containing one or two selected from aromatic and aliphatic rings in a main chain included in a compounding resin for optical film. The optical film including the compounding resin containing the acryl-based copolymer is excellent in transparency and heat resistance as well as in processability, adhesiveness, retardation property, and durability.

DETAILED DESCRIPTION OF THE PREFERRED EMBODIMENT

Exemplary embodiments of the present invention will now be described in detail.

An aspect of the present invention is an acryl-based copolymer including an alkyl(meth)acrylate-based monomer; a (meth) acrylate-based monomer containing an aliphatic ring; and a maleimide monomer.

In the specification, a copolymer resin including monomers means that monomers are polymerized and included as a repeating unit in the copolymer resin.

As used herein, 'a (meth)acrylate monomer' means to include 'an acrylate monomer' or 'a methacrylate monomer'.

The acryl-based copolymer may be, but not limited to, a block copolymer or a random copolymer.

In the acryl-based copolymer resin, the alkyl(meth)acrylate-based monomer means to include all of akylacrylate-based and alkylmethacrylate-based monomers. The alkyl group in the alkyl(meth)acrylate-based monomer preferably has the carbon number of 1-10, more preferably the carbon number of 1-4, and the group may be methyl group group or ethyl group. The alkyl methacrylate-based monomer may include, but not limited to, methylmethacrylate.

The alkyl(meth)acrylate-based monomer is preferably present in an amount of 50-98.9 parts by weight based on a total content of an acryl copolymer, and more preferably 50-90 parts by weight. When the acrylate-based monomer is present in the range, the heat resistance may be maintained while the transparency is excellent.

In the acryl-based copolymer resin, a (meth)acrylate-based monomer containing an aromatic ring serves to enhance the compatibility with a resin containing one or two selected from aromatic and aliphatic rings in a main chain.

The (meth)acrylate-based monomer containing the aromatic ring preferably has an aromatic ring which has the carbon number of 6 to 12, and specifically, may be a phenyl (meth)acrylate-based monomer and phenylmethacrylate is more preferred.

In the acryl-based copolymer resin, the (meth)acrylate-based monomer containing the aromatic ring is preferably present in an amount of more than 0 to less than 50 parts by weight based on a total content of the acryl copolymer, and more preferably in an amount of more than 5 to 30 or less parts by weight. When the (meth)acrylate-based monomer containing the aromatic ring is present in the range, the compatibility with a resin containing aromatic and/or aliphatic rings in a main chain may be sufficiently secured.

In the acryl-based copolymer resin, a maleimide-based monomer serves for the copolymer of the present invention to exhibit higher heat resistance and strength. The maleimide-based monomer preferably includes a maleimide-based monomer substituted by an alkyl group having the carbon number of 1 to 10 or by an aryl group having the carbon number of 6 to 12, and cyclo hexyl maleimide or phenylmaleimide is more preferred. The maleimide monomer is present preferably in an amount of 0.1 to 10 parts by weight based on a total content of the acryl copolymer.

The weight average molecular weight of the acryl-based copolymer is preferably 50,000~500,000.

In addition, the weight average molecular weight of the acryl-based copolymer resin is preferably 50,000 to 500,000 in terms of heat resistance, processability, and productivity.

A second aspect of the present invention is a compounding resin in which the acryl-based copolymer of an aspect of the present invention is mixed with the resin containing one or two selected from aromatic and aliphatic rings in a main chain.

In the resin composition, the resin containing one or two selected from aromatic and aliphatic rings in a main chain may use, for example, polycarbonate-based, polyarylate-based, polynaphthalene-based, polynorbornene-based resins, etc., polycarbonate-based resins are more preferred but it is not limited thereto.

In the resin composition, the weight ratio of the acryl-based copolymer to the resin containing one or two or more selected from aromatic and aliphatic rings in a main chain is preferably 60~99.9:0.1~40, and more preferably 70~99:1~30.

The resin composition may be prepared by blending the acryl-based copolymer resin with the resin containing one or two selected from aromatic and aliphatic rings in the main chain according to methods well known to the art, such as compounding method, and additives well known to the art, such as coloring agents, flame retardants, reinforcing agents, fillers, UV stabilizers, antioxidants, etc. may be included in an amount of 0.001 to 50 parts by weight based on 100 parts by weight of the resin composition.

The glass transition temperature of the resin composition is preferably 110° C. or more, and more preferably 120° C. or more. The glass transition temperature is not specially limited, but may be 200° C. or less.

In addition, the weight average molecular weight of the resin composition is preferably 50,000 to 200,000 in terms of heat resistance, sufficient processability, and productivity, etc.

A third aspect of the present invention is an optical film including the compounding resin.

An optical film according to the present invention may have different retardation values depending on the content of the resin containing one or two selected from aromatic and aliphatic rings in a main chain, and accordingly, the film may be used as a retardation compensation film or a protection film.

The retardation compensation film may be used in a VA mode type or TN mode type, depending on the retardation value. An optical film according to the present invention may have an in-plane retardation value ($R_{in}$) of 20 nm to 100 nm and a thickness retardation value ($R_{th}$) of −50 nm to −400 nm, and in this case, the film may be used as a VA mode-type retardation compensation film. In addition, an optical film of the present invention may have an in-plane retardation value ($R_{in}$) of 0 nm to 10 nm, preferably 0 nm to 5 nm, and more preferably about 0 nm to 10 nm, and a thickness retardation value ($R_{th}$) of −10 nm to 10 nm, and preferably −5 nm to 5 nm. In this case, the optical film of the present invention may be useful in use cases where isotropic property is required, for example, as a polarizer protection film, etc.

In the present invention, the retardation value of the optical film may be controlled by appropriately controlling the content of the resin containing one or two selected from aromatic and aliphatic rings in a main chain.

As an example, when the resin containing one or two selected from aromatic and aliphatic rings in a main chain is present in an amount of 10 wt % to 40 wt %, an optical film may have an in-plane retardation value ($R_{in}$) of 20 nm to 100 nm and a thickness retardation value ($R_{th}$) of −50 nm to −400 nm. In this case, an optical film according to the present invention may be used as a VA mode type retardation compensation film.

As another example, when the resin containing one or two selected from aromatic and aliphatic rings in a main chain is present in an amount of 0.1 wt % to 10 wt %, and more preferably 1 wt % to 5 wt %, an optical film may have an in-plane retardation value ($R_{in}$) of 0 nm to 10 nm, preferably 0 to nm to 5 nm, and more preferably about 0 nm and a thickness retardation value ($R_{th}$) of −10 nm to 10 nm, preferably −5 nm to 5 nm, and more preferably about 0 nm. In this case, an optical film according to the present invention may be used as a polarizer protection film. In the optical film in 3), the resin composition in 2) may be prepared into a film by methods well known to the art, such as a solution cast method or extrusion method, and the solution cast method is preferable among them.

The method may further include stretching the film prepared as above uniaxially or biaxially, and conditioners may be also added for preparation depending on the case.

When the film is stretched uniaxially or biaxially, the stretching process may be performed in the machine direction (MD) and the transverse direction (TD), respectively, and in both the directions. When the stretching is performed in both the MD and TD, the stretching may be performed first in one of the directions and then in the other direction, and simultaneously in both the directions. The stretching may be performed in a single step or in multi-steps. When the stretching is performed in the MD, the stretching may be performed by using a difference in speed between rolls. When the stretching is performed in the TD, a tenter may be used. The rail initiating angle of the tenter is 10° or less, a Bowing phenomenon that occurs when the stretching is performed in the TD is suppressed, and the angle of the optical axis is regularly controlled. The TD stretching may be performed in multi-steps to obtain the suppression effects of the Bowing phenomenon. When the glass transition temperature of the resin composition is $T_g$, the stretching may be performed at a temperature in the range of ($T_g-20°$ C.) to ($T_g+30°$ C.). The glass transition temperature means a range from a temperature at which storage elasticity of the resin composition begins to be reduced and the loss elasticity begins to be larger than the storage elasticity to a temperature at which the orientation of the polymer chain is loosened and removed. The glass transition temperature may be measured by using a differential scanning calorimeter (DSC). The temperature at which the stretching process is performed may be the glass transition temperature of the film.

In the case of a small stretching machine (Universal testing machine, Zwick Z010), the stretching is preferably performed in the range of 1 to 100 mm/min. In the case of a pilot stretching machine, the stretching rate is preferably in the range of 0.1 to 2 mm/min. In addition, the film is preferably stretched by using a stretching ratio in the range of 5 to 300%. An optical film according to the present invention may be stretched uniaxially or biaxially by the method as described above to control the retardation properties.

The optical film prepared as above has preferably an in-plane retardation value of 0 nm to 200 nm, represented by the following Mathematical Formula 1 and preferably a thickness retardation value of 10 nm to −400 nm, represented by the following Mathematical Formula 2.

$$R_{in}=(n_x-n_y)\times d \qquad \text{<Mathematical Formula 1>}$$

$$R_{th}=(n_z-n_y)\times d \qquad \text{<Mathematical Formula 2>}$$

Where, $n_x$ is a refractive index of a direction where the index is a maximum in the in-plane direction of the film, $n_y$ is a refractive index of a direction perpendicular to the $n_x$ direction in the in-plane direction of the film, $n_z$ is a refractive index in the thickness direction, and d is the thickness of the film.

In an optical film according to the present invention, an in-plane retardation value and a thickness retardation value may be controlled, depending on the content of the resin containing one or two selected from aromatic and aliphatic rings in a main chain. For example, an in-plane retardation value ($R_{in}$) and a thickness retardation value ($R_{th}$) of an optical film according to the present invention may be 20 nm to 100 nm and −50 nm to −400 nm, respectively. In this case, an optical film according to the present invention may be used as a VA mode type retardation compensation film.

In addition, an optical film according to the present invention may have an in-plane retardation value ($R_{in}$) of 0 nm to 10 nm, preferably 0 nm to 5 nm, and more preferably about 0 nm, and a thickness retardation value ($R_{th}$) of −10 nm to 10 nm, preferably −5 nm to 5 nm, and more preferably about 0 nm. In this case, an optical film according to the present invention may be used as a polarizer protection film.

When an optical film according to the present invention is used in a liquid display device, the film is provided only on either one of the sides of a liquid crystal panel (1 sheet type), or on both sides of the liquid crystal panel (2 sheet type). When an optical film according to the present invention is provided only on either one of the sides of a liquid crystal panel, the film has an in-plane retardation value ($R_{in}$) of 30 nm to 80 nm, preferably 35 nm to 70 nm, and more preferably about 40 to 60 nm, and a thickness retardation value ($R_{th}$) of −270 nm or less, that is, the absolute value of the thickness retardation value is preferably 270 or more.

When an optical film according to the present invention is provided on both sides of a liquid crystal panel, the film has an in-plane retardation value ($R_{in}$) of 30 nm to 80 nm, preferably 35 nm to 70 nm, and more preferably about 40 to 60 nm, and a thickness retardation value ($R_{th}$) of −100 nm or less, that is, the absolute value of the thickness retardation value is preferably 100 or more.

The brittleness of an optical film according to the present invention may be measured by shedding an iron sphere having a diameter of 15.9 nm and a weight of 16.3 kg on a test film and measuring the height of a hole made on the film, and an optical film according to the present invention has preferably a height of 600 mm or more, and more preferably 700 nm or more.

An optical film according to the present invention has preferably a haze value of 1% or less, more preferably 0.5% or less, and most preferably 0.1% or less.

Hereinafter, preferred embodiments of the present invention will be described for better understanding. However, the following embodiments are only illustrative examples and are not intended to limit the present invention hereby.

The evaluation methods of physical properties in Examples of the present invention are performed as follows.

Weight average molecular weight ($M_w$): measured by dissolving a prepared resin in tetrahydrofuran and subjecting the resulting solution to gel permeation chromatography (GPC).

$T_g$ (Glass Transition Temperature): measured by using a Differential Scanning calorimeter (DSC) from TA Instrument, Co.

Retardation values ($R_{in}/R_{th}$): measured by stretching a film at the glass transition temperature of the film and then using AxoScan from Axometrics, Co.

Measurement of Transparency: measured in accordance with the ASTM 1003 method.

Example 1

91 parts by weight of methylmethacrylate, 5 parts by weight of phenylmethacrylate, and 4 parts by weight of phenylmaleimide monomer were used to prepare an acryl-based copolymer resin. The glass transition temperature and the molecular weight of the prepared resin were measured and as a result, a resin with the glass transition temperature of 125° C. and the weight average molecular weight of 110,000 was obtained. 90 parts by weight of the resin was compounded with 10 parts by weight of polycarbonate to prepare a final resin composition. The resin composition was prepared into a film by a solution cast method, followed by stretching at the glass transition temperature to measure the retardation values of the film. As a result, the in-plane retardation value/the thickness retardation value were 30/−80, respectively.

Example 2

86 parts by weight of methylmethacrylate, 10 parts by weight of phenylmethacrylate, and 4 parts by weight of a phenylmaleimide-based monomer were used to prepare an acryl-based copolymer resin. The glass transition temperature and the molecular weight of the prepared resin were measured and as a result, a resin with the glass transition temperature of 126° C. and the weight average molecular weight of 115,000 was obtained. 85 parts by weight of the resin was compounded with 15 parts by weight of polycarbonate to prepare a final resin composition. The resin composition was prepared into a film by a solution cast method, followed by stretching at the glass transition temperature to measure the retardation values of the film. As a result, the in-plane retardation value/the thickness retardation value were 45/−120, respectively.

Example 3

76 parts by weight of methylmethacrylate, 20 parts by weight of phenylmethacrylate, and 4 parts by weight of a phenylmaleimide-based monomer were used to prepare an acryl-based copolymer resin. The glass transition temperature and the molecular weight of the prepared resin were measured and as a result, a resin with the glass transition temperature of 128° C. and the weight average molecular weight of 115,000 was obtained. 80 parts by weight of the resin was compounded with parts by weight of polycarbonate to prepare a final compounding resin. The compounding resin was prepared into a film by a solution cast method, followed by stretching at the glass transition temperature to measure the retardation values of the film. As a result, the in-plane retardation value/the thickness retardation value were 60/−280, respectively.

Example 4

76 parts by weight of methylmethacrylate, 20 parts by weight of phenylmethacrylate, and 4 parts by weight of a phenylmaleimide-based monomer were used to prepare an acryl-based copolymer resin. The glass transition temperature and the molecular weight of the prepared resin were measured and as a result, a resin with the glass transition temperature of 128° C. and the weight average molecular weight of 115,000 was obtained. 75 parts by weight of the resin was compounded with parts by weight of polycarbonate to prepare a final compounding resin. The compounding resin was prepared into a film by a solution cast method, followed by stretching at the glass transition temperature to measure the retardation values of the film. As a result, the in-plane retardation value/the thickness retardation value were 70/−330, respectively.

Example 5

76 parts by weight of methylmethacrylate, 20 parts by weight of phenylmethacrylate, and 4 parts by weight of a cyclohexyl maleimide-based monomer were used to prepare an acryl-based copolymer resin. The glass transition temperature and the molecular weight of the prepared resin were measured and as a result, a resin with the glass transition temperature of 130° C. and the weight average molecular weight of 120,000 was obtained. 75 parts by weight of the resin was compounded with 25 parts by weight of polycarbonate to prepare a final compounding resin. The compounding resin was prepared into a film by a solution cast method, followed by stretching at the glass transition temperature to measure the retardation values of the film. As a result, the in-plane retardation value/the thickness retardation value were 80/−370, respectively.

Comparative Example 1

91 parts by weight of methylmethacrylate, 5 parts by weight of cyclohexyl methacrylate, and 4 parts by weight of a phenylmaleimide-based monomer were used to prepare an acryl-based copolymer resin. The glass transition temperature and the molecular weight of the prepared resin were measured and as a result, a resin with the glass transition temperature of 124° C. and the weight average molecular weight of 115,000 was obtained. 80 parts by weight of the resin was compounded with parts by weight of polycarbonate to prepare a final compounding resin. The compounding resin was prepared into a film by a solution cast method, followed by stretching at the glass transition temperature to prepare the film. However, although it was attempted to measure the retardation values of the film, they failed to be measured due to the generation of haze in the film.

Comparative Example 2

76 parts by weight of methylmethacrylate, 20 parts by weight of cyclohexyl methacrylate, and 4 parts by weight of a cyclohexyl maleimide-based monomer were used to prepare an acryl-based copolymer resin. The glass transition temperature and the molecular weight of the prepared resin were measured and as a result, a resin with the glass transition temperature of 126° C. and the weight average molecular weight of 115,000 was obtained. 80 parts by weight of the resin was compounded with 20 parts by weight of polycarbonate to prepare a final compounding resin. The compounding resin was prepared into a film by a solution cast method, followed by stretching at the glass transition temperature to prepare the film. However, although it was attempted to measure the retardation values of the film, they failed to be measured due to the generation of haze in the film.

The following Table 1 shows components and contents of the copolymers and measurement results of the glass transition temperatures and the weight average molecular weights of the copolymers, in Examples 1 to 5 and Comparative Examples 1 and 2.

TABLE 1

| | Monomer (Parts by weight) | | | Glass Transition | Weight Average |
|---|---|---|---|---|---|
| | MMA | PhMA/CHMA | PMI/CHMI | Temperature (° C.) | Molecular Weight |
| Example 1 | 91 | 5/0 | 4/0 | 125 | 110,000 |
| Example 2 | 86 | 10/0 | 4/0 | 126 | 115,000 |
| Example 3 | 76 | 20/0 | 4/0 | 128 | 115,000 |
| Example 4 | 76 | 20/0 | 4/0 | 128 | 115,000 |
| Example 5 | 76 | 20/0 | 0/4 | 130 | 120,000 |
| Comparative Example 1 | 91 | 0/5 | 4/0 | 124 | 115,000 |
| Comparative Example 2 | 76 | 0/20 | 0/4 | 126 | 115,000 |

MMA: Methylmethacrylate
PhMA: Phenylmethacrylate
CHMA: Cyclohexyl methacrylate

TABLE 1-continued

| | Monomer (Parts by weight) | | | Glass Transition Temperature (°C.) | Weight Average Molecular Weight |
|---|---|---|---|---|---|
| | MMA | PhMA/ CHMA | PMI/CHMI | | |

PMI: Phenylmaleimide
CHMI: Cyclohexyl maleimide

TABLE 2

| | Monomer (Parts by weight) | | Trans-parency | | |
|---|---|---|---|---|---|
| | Acryl copolymer | PC | Haze (%) | Rin (nm) | Rth (nm) |
| Example 1 | 90 | 10 | ○ | 30 | −80 |
| Example 2 | 85 | 15 | ○ | 45 | −120 |
| Example 3 | 80 | 20 | ○ | 60 | −280 |
| Example 4 | 75 | 25 | ○ | 70 | −330 |
| Example 5 | 75 | 25 | ○ | 80 | −370 |
| Comparative Example 1 | 80 | 20 | Δ | Measurement not possible | Measurement not possible |
| Comparative Example 2 | 80 | 20 | Δ | Measurement not possible | Measurement not possible |

As shown in the Table 2, it is known that the transparency and retardation of an optical film using an acryl-based copolymer of the present invention are better than those in Comparative Examples.

While the present invention has been shown and described in connection with the exemplary embodiments, it will be apparent to those skilled in the art that modifications and variations can be made without departing from the spirit and scope of the invention as defined by the appended claims.

While the present invention has been shown and described in connection with the exemplary embodiments, it will be apparent to those skilled in the art that modifications and variations can be made without departing from the spirit and scope of the invention as defined by the appended claims.

What is claimed is:

1. An acryl-based copolymer comprising:
   an alkyl(meth)acrylate-based monomer;
   phenyl (meth)acrylate; and
   a maleimide-based monomer.

2. The acryl-based copolymer of claim 1, wherein the acryl-based copolymer comprises
   50 to 98.9 parts by weight of the alkyl(meth)acrylate-based monomer;
   0.1 to 50 parts by weight of phenyl(meth)acrylate; and
   0.1 to 10 parts by weight of the maleimide-based monomer based on 100 parts by weight of the acryl-based copolymer.

3. The acryl-based copolymer of claim 1, wherein the alkyl(meth)acrylate-based monomer is methyl (meth)acrylate.

4. The acryl-based copolymer of claim 1, wherein the maleimide-based monomer is a maleimide-based monomer substituted by an alkyl group having the carbon number of 1 to 10 or by an aryl group having the carbon number of 6 to 12.

5. The acryl-based copolymer of claim 1, wherein the weight average molecular weight of the acryl-based copolymer is 50,000-500,000.

6. A compounding resin comprising:
   the acryl-based copolymer of claim 1; and
   a polycarbonate-based resin,
   wherein the copolymer is mixed with the polycarbonate-based resin.

7. The compounding resin of claim 6, wherein the compounding resin comprises 60 to 99.9 wt % of the acryl-based copolymer; and 0.1 to 40 wt % of the polycarbonate-based resin.

8. An optical film comprising:
   the compounding resin of claim 6.

9. The optical film of claim 8, wherein the optical film is a retardation compensation film or a protection film.

10. The optical film of claim 9, wherein the retardation compensation film is for a VA mode liquid crystal display device or for a TN mode liquid crystal display device.

11. The optical film of claim 8, wherein the optical film has an in-plane retardation value of 0 nm to 200 nm, represented by the following Mathematical Formula:

$$R_{in}=(n_x-n_y)\times d \qquad \text{<Mathematical Formula 1>}$$

where, $n_x$ is a refractive index of a direction where the index is a maximum in the in-plane direction of the film, $n_y$ is a refractive index of a direction perpendicular to the $n_x$ direction in the in-plane direction of the film, and d is the thickness of the film.

12. The optical film of claim 8, wherein the optical film has a thickness retardation value of −400 nm to 10 nm, represented by the following Mathematical Formula 2:

$$R_{th}=(n_z-n_y)\times d \qquad \text{<Mathematical Formula 2>}$$

where, $n_x$ is a refractive index of a direction where the index is a maximum in the in-plane direction of the film, $n_y$ is a refractive index of a direction perpendicular to the $n_x$ direction in the in-plane direction of the film, $n_z$ is a refractive index in the thickness direction, and d is the thickness of the film.

13. The optical film of claim 8, wherein the optical film has an in-plane retardation value of 20 nm to 100 nm, represented by the following Mathematical Formula 1 and a thickness retardation value of −50 nm to −400 nm, represented by the following Mathematical Formula 2:

$$R_{in}=(n_x-n_y)\times d \qquad \text{<Mathematical Formula 1>}$$

$$R_{th}=(n_z-n_y)\times d \qquad \text{<Mathematical Formula 2>}$$

Where, $n_x$ is a refractive index of a direction where the index is a maximum in the in-plane direction of the film, $n_y$ is a refractive index of a direction perpendicular to the $n_x$ direction in the in-plane direction of the film, $n_z$ is a refractive index in the thickness direction, and d is the thickness of the film.

14. The optical film of claim 8, wherein the optical film has an in-plane retardation value of 0 nm to 10 nm, represented by the following Mathematical Formula 1 and a thickness retardation value of −10 nm to 10 nm, represented by the following Mathematical Formula 2:

$$R_{in}=(n_x-n_y)\times d \qquad \text{<Mathematical Formula 1>}$$

$$R_{th}=(n_z-n_y)\times d \qquad \text{<Mathematical Formula 2>}$$

Where, $n_x$ is a refractive index of a direction where the index is a maximum in the in-plane direction of the film, $n_y$ is a refractive index of a direction perpendicular to the $n_x$ direction in the in-plane direction of the film, $n_z$ is a refractive index in the thickness direction, and d is the thickness of the film.

15. A liquid crystal display device comprising:
   the optical film of claim 8.

16. The liquid crystal display device of claim 15, wherein the liquid crystal display device is operated in a VA mode.

* * * * *